US005680289A

United States Patent [19]

Robinson et al.

[11] Patent Number: 5,680,289

[45] Date of Patent: Oct. 21, 1997

[54] SURGE ARRESTER

[75] Inventors: William M. Robinson, Palo Alto; John Seymour Mattis, Sunnyvale; Chuck F. Cooper, Mountain View; Jeffrey A. Bennett, Sunnyvale, all of Calif.

[73] Assignee: Raychem Corporation, Menlo Park, Calif.

[21] Appl. No.: 673,767

[22] Filed: Jun. 27, 1996

[51] Int. Cl.[6] .......... H02H 9/06

[52] U.S. Cl. .......... 361/127; 361/117; 338/21

[58] Field of Search .......... 361/56, 117, 118, 361/126, 127; 338/21

[56] References Cited

U.S. PATENT DOCUMENTS

| | | | |
|---|---|---|---|
| 4,262,318 | 4/1981 | Shirakawa et al. | 361/127 |
| 4,424,547 | 1/1984 | Titus et al. | 361/127 |
| 4,587,592 | 5/1986 | Nakano et al. | 361/127 |
| 4,656,555 | 4/1987 | Raudabaugh | 361/117 |
| 4,729,053 | 3/1988 | Maier et al. | 361/118 |
| 4,812,944 | 3/1989 | Eberhard et al. | 361/127 |
| 4,825,188 | 4/1989 | Parraud et al. | 338/21 |
| 4,833,438 | 5/1989 | Parraud et al. | 338/21 |
| 4,853,670 | 8/1989 | Stengard | 338/21 |
| 4,989,115 | 1/1991 | Bourdages et al. | 361/126 |
| 5,043,838 | 8/1991 | Sakich | 361/117 |
| 5,138,517 | 8/1992 | Raudabaugh | 361/117 |
| 5,159,158 | 10/1992 | Sakich et al. | 174/179 |
| 5,291,366 | 3/1994 | Giese et al. | 361/127 |
| 5,363,266 | 11/1994 | Wiseman et al. | 361/127 |
| 5,444,429 | 8/1995 | Sakich et al. | 338/21 |

FOREIGN PATENT DOCUMENTS

| | | | |
|---|---|---|---|
| 0683496 A1 | 11/1995 | European Pat. Off. | H01C 7/12 |
| 63-312602 | 12/1988 | Japan | H01C 7/12 |
| 0816926 | 7/1959 | United Kingdom . | |
| 0902197 | 7/1962 | United Kingdom . | |
| 2073965 B | 5/1984 | United Kingdom | H01T 5/00 |

*Primary Examiner*—Jeffrey A. Gaffin
*Assistant Examiner*—Ronald W. Leja
*Attorney, Agent, or Firm*—Herbert G. Burkard; Yuan Chao

[57] ABSTRACT

A surge arrester has a single varistor element or a stack of varistor elements held between two end terminals by a plurality of elongate strength members disposed therearound. The ends of the strength members are inserted into recesses in the end terminals. Crimping of the end terminals distorts the recesses sufficiently to hold the strength members firmly therewithin, but without shearing and crushing (or otherwise damaging) the strength members.

20 Claims, 5 Drawing Sheets

SURGE ARRESTER

TECHNICAL FIELD OF THE INVENTION

This invention relates to surge arresters for protecting electrical equipment.

BACKGROUND OF THE INVENTION

Surge arresters are used to protect equipment connected to power distribution networks from damage by excessive voltage situations caused by lightning strikes, switching surges, incorrect connections, and other abnormal conditions or malfunctions.

The active element in a surge arrester often is a varistor, also referred to as a non-linear resistor because it exhibits a nonlinear current-voltage relationship. If the applied voltage is less than a certain voltage (the switching or clamping voltage) the varistor is essentially an insulator and only a small leakage current flows through it. If the applied voltage is greater than the switching voltage, the varistor's resistance drops, allowing an increased current to flow through it. That is, a varistor is highly resistive below its switching voltage and substantially conductive above it. The voltage-current relationship of a varistor is described by the equation $$I = \left(\frac{V}{C}\right)^{\alpha}$$

where I is the current flowing through the varistor; V is the voltage across the varistor; C is a constant which is a function of the dimensions, composition, and method of fabrication of the varistor; and α (alpha) is a constant which is a measure of the nonlinearity of the varistor. A large α, signifying a large degree of nonlinearity, is desirable.

The surge arrester is commonly attached to an electrical power system in a parallel configuration, with one terminal of the device connected to a phase conductor of the electrical power system and the other terminal to ground or neutral. At normal system voltages, the surge arrester is resistant to current flow (except for the leakage current). But if an overvoltage condition exceeding the switching voltage develops, the surge arrester becomes conductive and shunts the surge energy to ground while "clamping" or limiting the system voltage to a value which can be tolerated without damage by the equipment being protected.

Commonly, a surge arrester contains a plurality of varistor elements arranged in a stack and electrically connected in series. Terminals attached to the ends of the stack connect the varistors to system and ground. In order to maintain good electrical contact between the various components, a spring or other means may be introduced (for example between two adjacent varistors or between the end of the stack and one of the terminals) to apply a compressive force to the components. A housing, typically made of porcelain or polymer, protects the stack from the environment and insulates it electrically. Representative disclosures of surge arrester designs include: Shirakawa et al., U.S. Pat. No. 4,262,318 (1981); Titus et al., U.S. Pat. No. 4,424,547 (1984); Nakano et al., U.S. Pat. No. 4,587,592 (1986); Raudabaugh, U.S. Pat. No. 4,656,555 (1987); Maier et al., U.S. Pat. No. 4,729,053 (1988); Eberhard et al., U.S. Pat. No. 4,812,944 (1989); Parraud et al., U.S. Pat. No. 4,825,188 (1989); Stengard, U.S. Pat. No. 4,853,670 (1989); Bourdages et al., U.S. Pat. No. 4,989,115 (1991); Sakich, U.S. Pat. No. 5,043,838 (1991)i Raudabaugh, U.S. Pat. No. 5,138,517 (1992); Giese et al., U.S. Pat. No. 5,291,366 (1994); Wiseman et al., U.S. Pat. No. 5,363,266 (1994); Bowthorpe EMP, GB 2,073,965 B (1981); and NGK Insulators, JP 63-312602 (1988); the disclosures of which are incorporated by reference. Surge arresters containing a single varistor instead of a stack of varistors are also known.

The design of a surge arrester so that it can be economically produced and is sturdy and lightweight, and wherein the varistor elements are electrically and mechanically protected is not a simple matter, as evidenced by the proliferation of designs, only a few of which are referenced above.

SUMMARY OF THE INVENTION

This invention provides a surge arrester, comprising a surge arresting means comprising at least one varistor element and having first and second opposed end surfaces and a lateral surface;

first and second electrically conductive terminals electrically contacting the surge arresting means at the first and second opposed end surfaces, respectively; each terminal having a plurality of recesses on a surface facing the surge arresting means;

a plurality of elongate strength members disposed around the lateral surface of the surge arresting means but spaced apart therefrom; each strength member having first and second ends firing into a respective recess and being tightly held therewithin by crimping of the terminal containing the recess and consequent deformation of the recess; the elongate strength members being held under tension and applying a compressive force to the surge arresting means; and a housing made of a polymeric material, wherein the polymeric material covers the surge arresting means and the strength members, partially covers the first and second terminals, and fills the space between the strength members and the surge arresting means.

In a preferred embodiment, the surge arresting means comprises plural varistor elements electrically connected in series and forming a stack of such varistor elements. In an alternative preferred embodiment, the surge arresting means comprises a single varistor element.

Preferably, the polymeric material of the housing fills any voids between the surge arresting means and the strength members.

The advantages of the surge arrester of the instant invention include a simple yet rugged construction, ease of manufacture, inexpensive components, robust dielectric strength, good environmental sealing, and the capability of pressure release in the event of internal gas build-up in the arrester. The surge arresters can be used to protect electrical equipment, especially those in electrical power distribution networks, from damage due to surges in the system voltage.

BRIEF DESCRIPTION OF THE DRAWING(S)

FIG. 1 shows a surge arrester of this invention. FIG. 1 a shows an optional compression member for use with the surge arrester of FIG. 1, while FIG. 1*b* shows such compression member installed between a varistor element and a terminal. FIG. 1*c* shows a different view of a section of the surge arrester of FIG. 1.

FIG. 2 shows a preferred embodiment of the invention. FIG. 2*a* and 2*b* show two variations of the embodiment of FIG. 2. FIG. 2*c* and 2*d* show the use of five and six strength members, respectively.

FIG. 3*a* and 3*b* show optional terminals for a surge arrester of this invention.

In this specification, numerals repeated from one figure to another denote like or equivalent elements.

DESCRIPTION OF THE PREFERRED EMBODIMENTS

Figure 1:
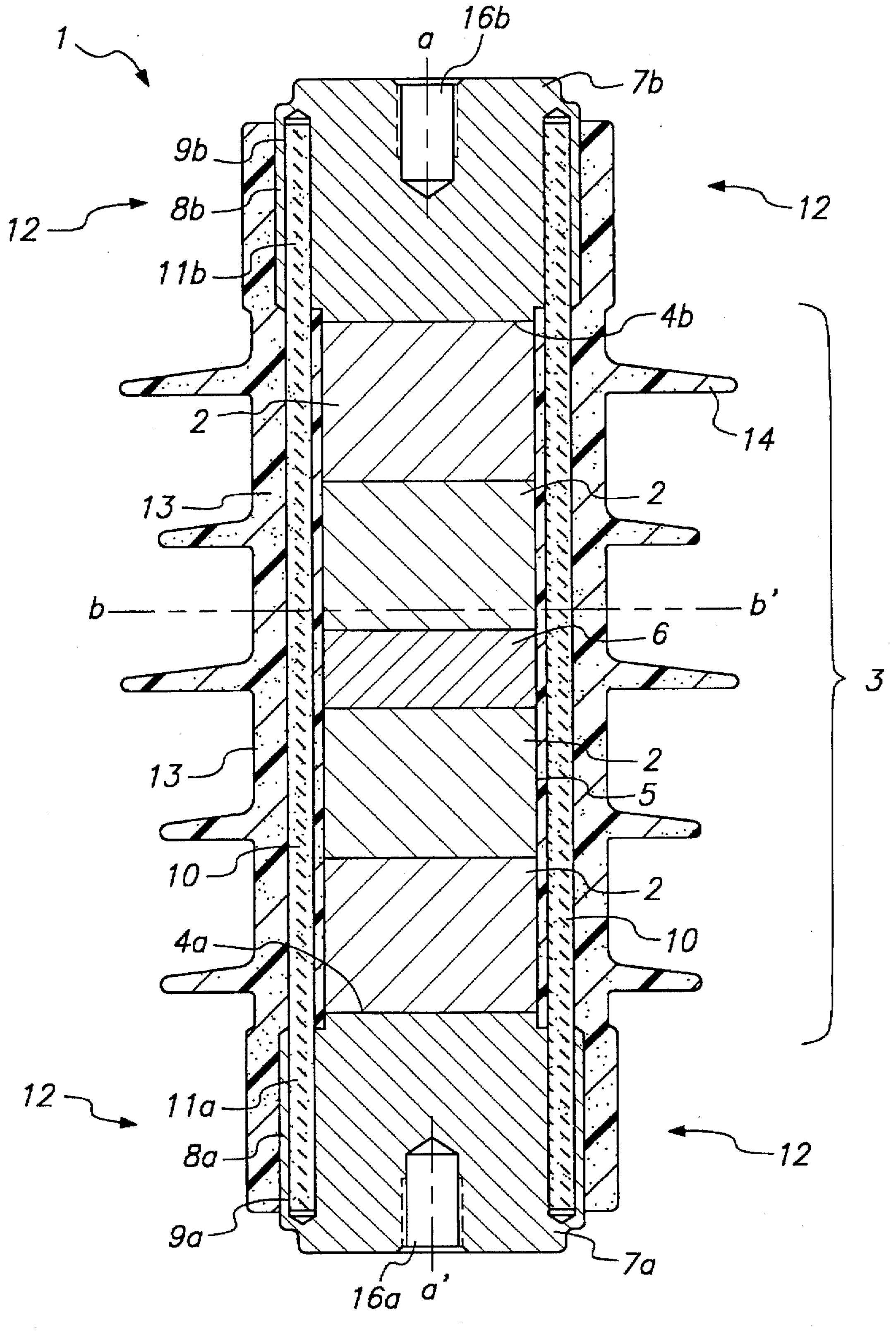
Figure 1A:
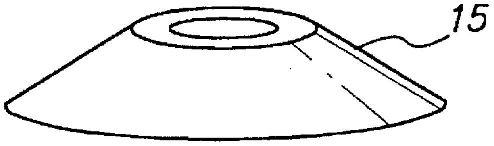

FIG. 1 shows a surge arrester 1 of this invention. A plurality of varistor elements 2 forms a stack 3 having opposed end surfaces 4a and 4b and a lateral surface 5. Preferably varistor elements 2 are disk-shaped, so that stack 3 is cylindrical. Optional spacer 6 lies between two adjacent varistor elements 2 and is made of a conductive material such as metal, in particular aluminum. Stack 3 is held between first and second terminals 7a and 7b, which engage stack 3 at end surfaces 4a and 4b thereof and make electrical contact therewith. Terminals 7a and 7b are made of a metal such as aluminum and serve as the means by which surge arrester 1 is connected to ground and the system. Bores 16a and 16b in terminals 7a and 7b, respectively, are for receiving studs via which such connection is made. Bores 16a and 16b may be smooth surfaced, as shown here, or threaded. Terminals 7a and 7b also have flanges 8a and 8b, respectively, extending beyond lateral surface 5 of stack 3. Flanges 8a and 8b each have a plurality of recesses 9a, 9b, respectively, opening to face stack 3. The assembly of terminals 7a, 7b, and stack 3 is held together by a plurality of strength members 10. Each strength member 10 has first and second ends 11a and lib fitting into a corresponding recess 9a and 9b. Strength members 10 are preferably disposed symmetrically around stack 3, about longitudinal axis a—a', but an asymmetric disposition also is within the scope of this invention. Strength members 10 are spaced apart from lateral surface 5. Preferably, there are 4 or 6 strength members, but a greater or lesser number, even or odd, can be used. Ends 11a, 11b are tightly gripped inside recesses 9a, 9b by crimping terminals 7a, 7b at their exterior surfaces, at the locations generally indicated by arrows 12. During the crimping step, stack 3 and terminals 7a, 7b are held under compression so that, after crimping, strength members 10 (which are reciprocally under tension) hold stack 3 under compression, ensuring good electrical contact among varistor elements 2 and between end surfaces 4a, 4b and terminals 7a, 7b. It is to be understood that, although FIG. 1 depicts a stack of four varistor elements 2, such a number is illustrative only and a greater or lesser number of varistor elements (including one single varistor element) can be used.

Strength members 10 preferably are made of a composite such as pultruded glass fiber reinforced resin, combining the better properties of glass (strong but with little elongation) and polymer resin (weaker but with good elongation and ability to bond glass to glass). The polymeric resin preferably is epoxy or vinyl ester resin. In pultrusion, a glass reinforced composite is made by impregnating continuous bundles of glass fibers with a liquid resin, then heating at an elevated temperature to cure the resin. Such materials are very strong in tension and have adequate bending strength—both requirements for strength members 10. Also, they have excellent electrical properties and retain their electrical and mechanical properties at elevated temperatures. The ductility is still within acceptable limits, even though it is more ductile than glass. Alternative materials may be used, but are less preferred, including ceramics (e.g., porcelain), which have the strength but not the toughness of composites, and organic materials such as aramid (e.g., Kevlar™) or nylon, despite limitations such as lesser electrical properties or mechanical strength, increased creep, or increased moisture uptake.

A housing 13, made of a polymeric material, is molded around the assembly such that the polymeric material encloses stack 3 and strength members 10 and fills the space between strength members 10 and stack 3. Housing 13 also partially covers terminals 7a, 7b. Housing 13 may have sheds 14 for increasing the surface leakage current path and is made of a tracking resistant material, such as appropriately formulated polyolefin polymers and copolymers such as ethylene-vinyl acetate copolymer (EVA), ethylene-propylene-diene monomer terpolymer (EPDM), and ethylene-propylene rubber (EPR), or silicone, or the like. Silicone and EVA are preferred.

Spacer 6 is made of a thermally and electrically conductive material such as a metal and serves a variety of functions. It is a heat sink for assisting the dissipation of the large amount of heat generated by current flowing through varistor elements 2. It helps spread the current flowing through stack 3 evenly throughout its cross-section. It also can prevent the material of housing 13 from ingressing during the molding operation. Lastly, spacer 6 serves a spacing function. During manufacture, it is desirable to make a series of surge arresters with different voltage ratings but with the same overall size, to simplify manufacturing. This can be achieved by varying the thickness and number of varistor elements 2, but inserting one or more appropriately sized spacers 6, so that the overall size of stack 3 and therefore surge arrester 1 remains constant. Thus, as used herein, a reference to a stack of varistors includes a stack in which one or more spacer elements separate varistor elements thereof. Spacer 6 may alternatively be positioned between a varistor element 2 and a terminal 7a or 7b.

Figure 1B:
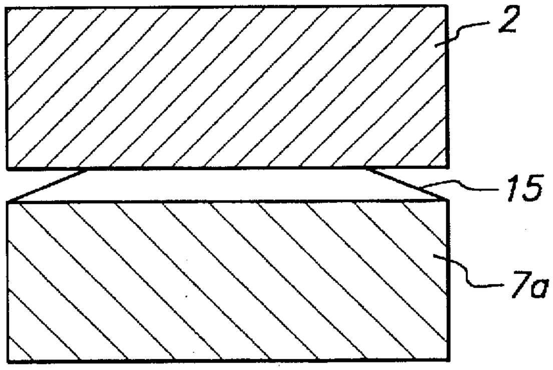

To further ensure good electrical contact, a compression member may be present, positioned between two components of stack 3 (e.g., between two varistor elements 2 or between a varistor element 2 and spacer 6), or between an end surface 4a and the corresponding terminal. FIG. 1 a shows an exemplary compression member 15 which can be used, specifically a Belleville washer. FIG. 1b shows in partial longitudinal cross section compression member 15 disposed between a varistor element 2 and terminal 7a. Thus, when it is stated herein that a terminal (7a or 7b, as the case may be) contacts an end surface (4a or 4b, as the case may be), such statement includes indirect contact, via an intervening element such as compression member 15 or spacer 6. To maintain electrical continuity, the compression member should be made of a conductor such as metal. The compression member can be a spring, such as the aforementioned Belleville washer, a circular spring, a disk spring, a disk spring with radial corrugations, a disk with finger spring members, and the like.

Figure 1C:
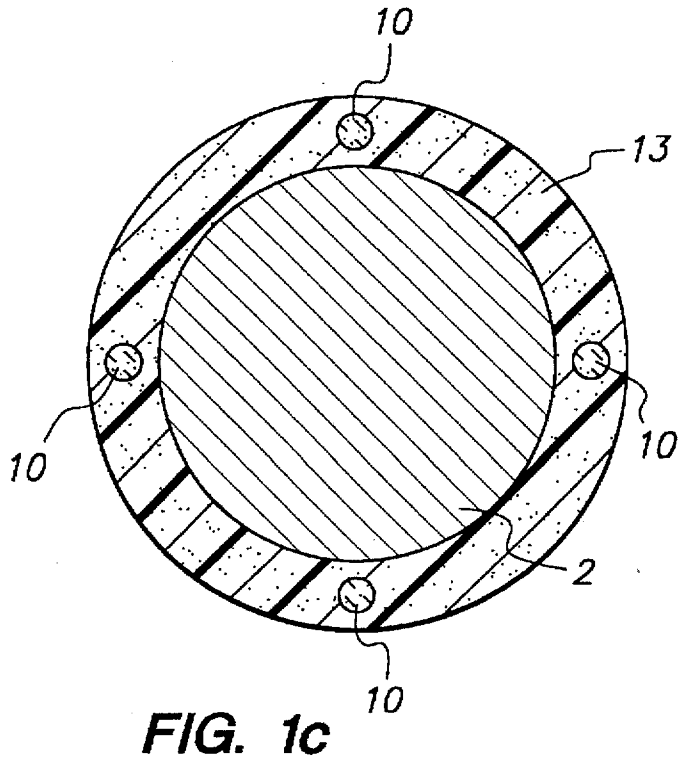

FIG. 1c is a transverse cross-section of arrester 1 of FIG. 1, taken along line b—b', showing the placement of the four strength members 10 around varistor element 2 and how the material of housing 13 fills the space between strength members 10 and varistor elements 2 without leaving voids.

Figure 2:
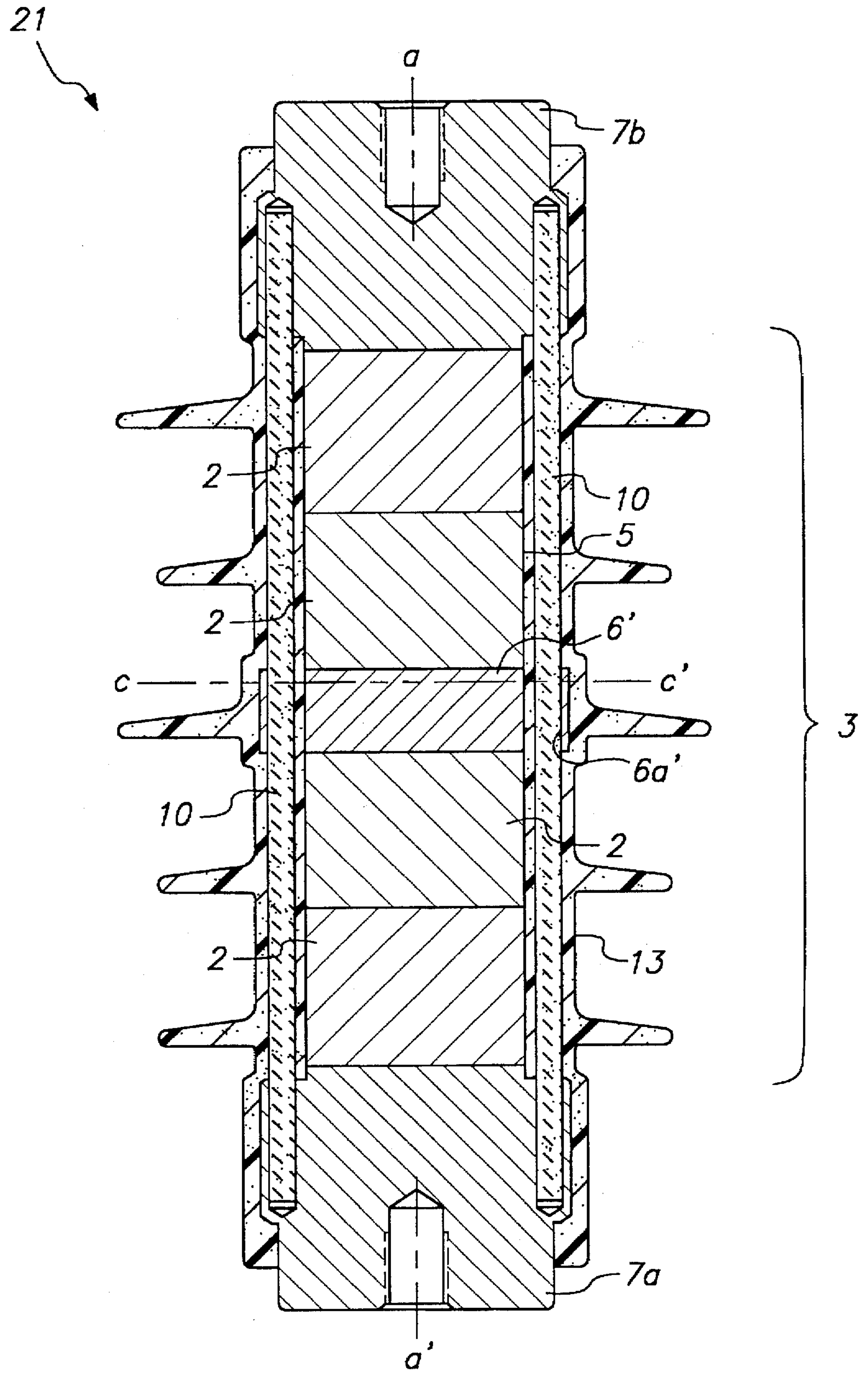
Figure 2A:
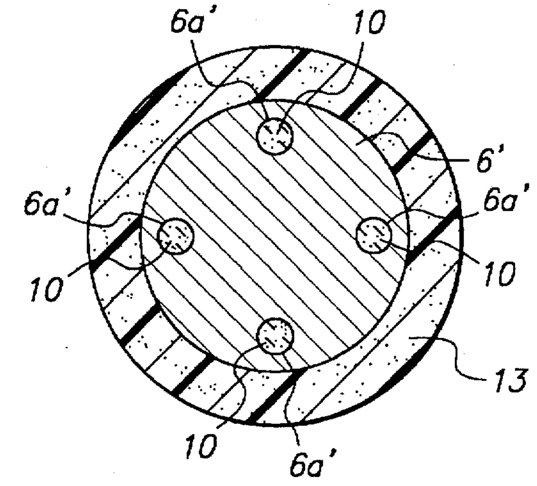

FIG. 2 shows a preferred embodiment of the invention. Arrester 21 of this figure differs from arrester 1 of FIG. 1 in the design of the spacer element. Here, spacer 6' extends beyond the lateral surface of stack 3 and contains at least one passageway 6a' through which passes a strength member 10. Thus, spacer 6' performs a reinforcing function, bracing the strength members around the middle of the stack. Spacer 6' preferably is disposed near the longitudinal middle of surge arrester 21 for most effective reinforcement, as opposed to near one of terminals 7a or 7b. To further illustrate this embodiment, reference is made to FIG. 2a and 2b, which are transverse cross-sections taken along line c—c' of FIG. 2. FIG. 2a shows how spacer 6' has four passageways 6a', through each of which passes a strength member 10.

Figure 2B:
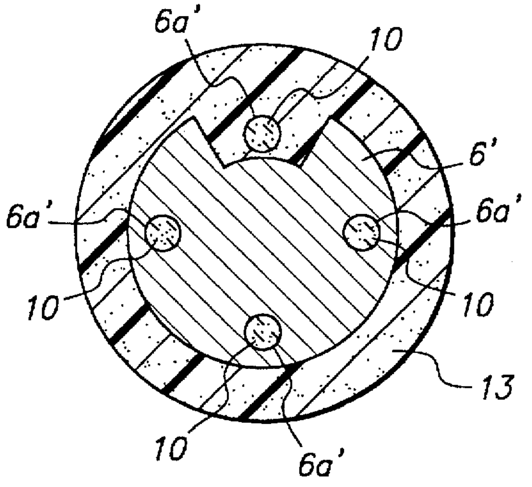
Figure 2C:
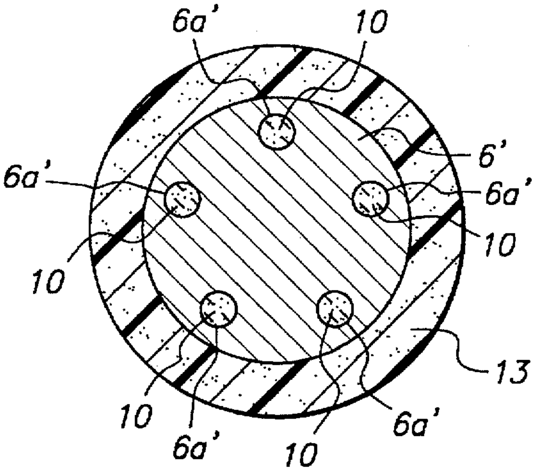
Figure 2D:
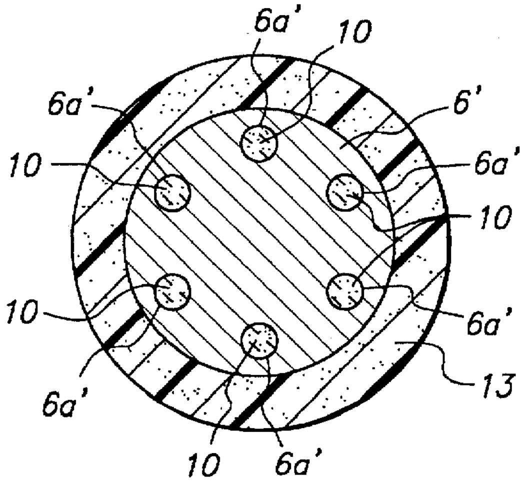

Although it is desirable to have a one-to-one relationship between passageways 6a' and strength members 10 for most effective reinforcement, such a relationship is not mandatory. As shown in FIG. 2b, not all strength members 10 need to pass through a passageway 6a'.

In some overvoltage situations, there may be varistor failure. When the varistor fails, arcing currents may flow through or over the varistor material, developing a plasma in the varistor or in areas immediately adjacent to a varistor surface. High pressures develop and the hot plasma gases may be expelled through the housing material. It is desirable in such circumstances that the ensuing are be moved away from the varistor elements and other structural components of the surge arrester, minimizing damage to the varistor elements, structural components, and housing. The greatest damage often occurs at the points where the arc roots. Therefore a useful strategy is to move the arc's roots to a location where damage is either minimized or more tolerable. This can be achieved by directing the conductive plasma to form a continuous path to a preferred rooting location, such as an exposed part of a terminal. However, in a conventional surge arrester design, the housing covers almost all of the terminals, so that the plasma has a long and convoluted path before finding its way to an exposed part of the terminal. Arcing tends to continue at the interface between the varistor elements and the housing, causing much damage.

Figure 3A:
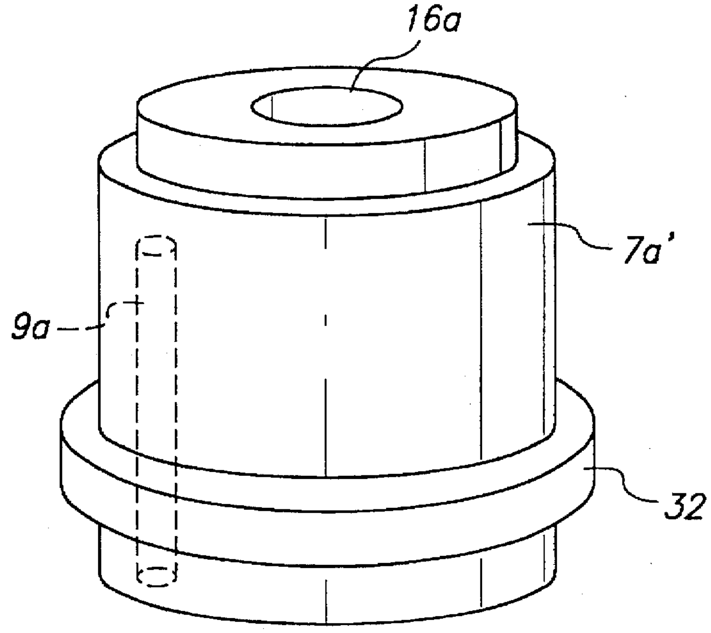
Figure 3B:
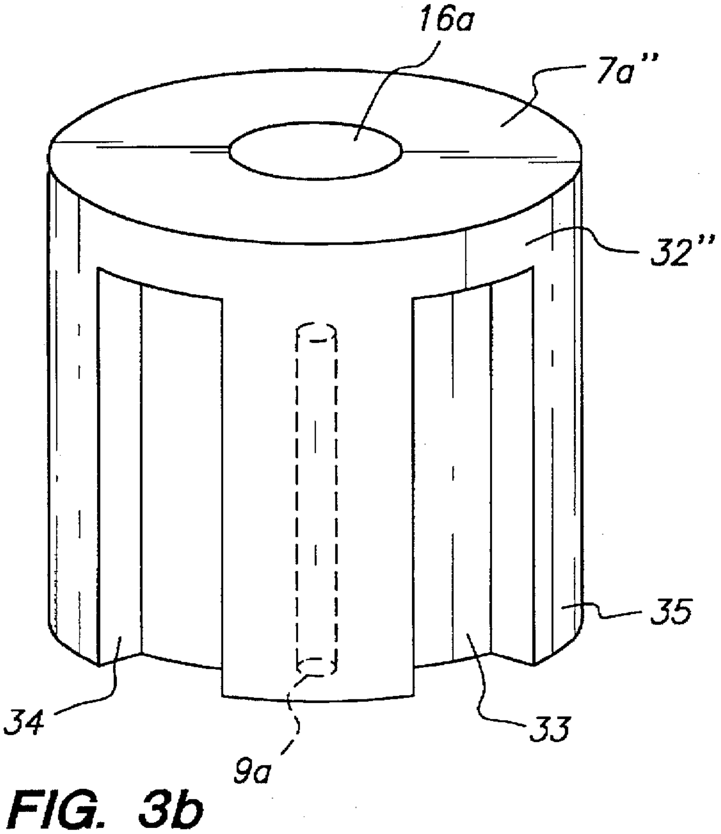

Optional preferred terminal designs for dealing with this problem are shown in FIGS. 3a and 3b. (Only one recess 9a is shown in these figures for the sake of simplicity, although it is to be understood that more are present.) FIG. 3a shows a terminal 7a' which differs from terminal 7a of FIG. 1 in having a ridge 32' circumscribing the side surface of terminal 7a' proximal to its inner facing end surface, i.e., near where terminal 7a' contacts a varistor element (not shown). Ridge 32 projects outwards from terminal 7a' and in the completed surge arrester is left at least partially uncovered by the polymeric material of the housing (not shown). Ridge 32, being positioned near the varistor-terminal junction where arcing is likely to develop and further being exposed (i.e., not obstructed by insulating material), serves as a convenient and readily accessible site for transferring the are. Thus, a terminal-to-terminal arc with rooting points at the respective ribs 32' replaces the original are rooted at varistor elements 2. Because ridge 32' is of relatively thick metallic construction and performs no structural function, an are rooted thereon will take a long time to erode the metal and the damage caused by such erosion is minimized. In effect, ridge 32' serves as a sacrificial rooting location for the are.

FIG. 3b shows an alternative terminal 7a" which, like terminal 7a' of FIG. 3a, a rib to which an are can transfer and root. However, ridge 32" is positioned at the end of terminal 7a" distal from its inner facing end surface, that is, distant from the varistor-terminal junction. Again, in the completed surge arrester ridge 32" is left at least partially uncovered by the material of the housing (not shown). To facilitate are transfer from an initial rooting point at or near the varistor-terminal junction, grooves 33 are provided, such grooves 33 being defined by walls 34 of flanges 35. Flanges 35 are thickened sections of terminal 7a" and accommodate recesses 9a therewithin.

Such ridged terminals and their mode of operation are further described in copending, commonly assigned U.S. patent applications of Bennett et at., Ser. No. 08/672,184, filed even date herewith under the title "SURGE ARRESTER HAVING RIDGED TERMINALS" and Bennett et al., Ser. No. 08/672,733, filed even date herewith under the title "SURGE ARRESTER HAVING GROOVED AND RIDGED TERMINALS"; the disclosures of which are incorporated herein by reference.

A common varistor material is a polycrystalline sintered ceramic of zinc oxide (the primary metal oxide) containing additionally minor amounts of oxides of other metals (the additive metal oxides) such as $Al_2O_3$, $B_2O_3$, $BaO$, $Bi_2O_3$, $CaO$, $CoO$, $Co_3O_4$, $Cr_2O_3$, $FeO$, $In_2O_3$, $K_2O$, $MgO$, $Mn_2O_3$, $Mn_3O_4$, $MnO_2$, $NiO$, $PbO$, $Pr_2O_3$, $Sb_2O_3$, $SiO_2$, $SnO$, $SnO_2$, $SrO$, $Ta_2O_5$, $TiO_2$, or combinations thereof.

In a preferred method for making varistor materials for use in this invention, soluble salt precursors of the additive metal oxides are converted to the respective oxides and hydroxides in the presence of zinc oxide powder by a precipitant, commonly ammonium hydroxide. Preferably, the additive metal oxides or their precursors are combined with the zinc oxide, and then the precipitant is added to the mixture, although the reversed mixing sequence may also be used. The additive metal oxides precipitate onto or around the zinc oxide, to form a precursor powder which is an intimate mixture of zinc oxide and the additive metal oxides. The precursor powder is collected, dried, and formed into a desired shape (the green body) and sintered at an elevated temperature (typically 1,000°–1,400° C.) to develop the characteristic polycrystalline microstructure responsible for the varistor properties. During the sintering, any hydroxides are converted to the corresponding oxides. Eda et al., Japanese laid-open application no. 56-101711 (1981) and Thompson et at., U.S. Pat. No. 5,039,452 (1991), the disclosure of which is incorporated herein by reference, disclose suitable precipitation processes.

Other disclosures relating varistor materials which may be used include Matsuoka et al., U.S. Pat. No. 3,496,512 (1970); Eda et at., U.S. Pat. No. 4,551,268 (1985); and Levinson, U.S. Pat. No. 4,184,984 (1980). Additionally, varistor materials based on materials other than zinc oxide may also be used, for example silicon carbide, titanium oxide, strontium oxide, or strontium titanate varistors.

Varistor disks may have electrodes deposited on their end surfaces for improving electrical contact. The electrodes may be deposited by plasma spraying a conductor (e.g., aluminum), silk screening a conductive ink (e.g., silver ink), vacuum depositing a conductor, electroless plating, flame spraying, and the like.

Contrary to the teachings in the art, we have found that it is possible to crimp the strength members by a perimetral crimping process but yet attain surprisingly high pull out strengths. It is taught in the prior art (GB 902,197 (1959) and GB 816,926 (1957)) that great care must be used in gripping fiberglass rods by crimping a metal part onto them, because they are easily crushed. As stated at page 5, line 75 et seq. of the '926 patent, "This result is surprising for it would be expected that the effect of compressing a metallic sleeve on to a resin bonded fibre glass rod or tube would be to crush the glass fibre/resin matrix and render it mechanically weak and it is unexpected having regard to the fact that resin-bonded fibre glass rod and tube are weak in shear in the direction of their length." This statement implies that a fiberglass rod should be gripped in a way such that the forces applied to the rod are radial and approximately radially uniform in magnitude around the rod. If not, the matrix would shear and the rod would be destroyed. The fact that we can crimp onto a metal terminal and cause it to deform in such a way as to apply forces that are sufficiently radially uniform to a bore located off-center in the terminal such that a rod located within the terminal is firmly grasped, but without destroying it, is indeed surprising.

Components for surge arresters of the present invention are fabricated by processes well known in the art, e.g., die cast process for end terminals and pultrusion process for glass fiber-reinforced rods to be used as the strength members. The rods are cut to length by sawing or other suitable process. For best performance, the components are cleaned to remove processing aids and debris from manufacture. Several strength members are placed in their respective bores of the first end terminal to aid component alignment, and varistor components are then stacked onto the first end terminal. These varistor stacks may be separated from the end terminals by an optional thin spacer. This spacer prevents end terminal deformation from impinging on the face of a varistor element. Other spacers may be placed between varistor elements. These additional spacers may have bores through which the rods pass, reinforcing them against lateral loads. A spring may also be placed within the stack, to maintain the stack under compression and increase contact pressure between varistor elements (for better electrical contact). When the stack of components is completed, the remaining strength members are inserted through the optional spacer bores and into the bores of the first end terminal. The assembly is complete when the bores of the second end terminal are slipped over their respective strength members.

The assembled stack is then aligned in a machine where axial pressure is applied, compressing the spring, if present. The end terminals are then aligned with the crimping dies, and are crimped in succession. Intermediate reinforcing spacers may be crimped or not.

For added performance, an optional primer can be applied to the completed stack. The primer is an aid to promote adhesion between the polymer housing and the completed stack. The completed stack is then optionally heated in an oven before placement in a mold for thermoplastic or thermosetting materials.

The mold is closed, capturing and aligning the completed stack, and polymer material is injected in and around components of the completed stack. The mold is held in the closed position until either the thermoplastic material cools or the thermosetting materials cures, depending on which type of material is used. The mold is then opened, the complete arrester is removed and post-mold operations are performed. Such operations include, but are not limited to, removal of gate material and any polymer flash. Other additional and optional operations such as accessory installation could also be carried out on the completed arrester.

The preceding description is one method for arrester manufacture. Other methods may be suitable and variations from of the aforementioned description may be used. As an example, a casting operation can be used to form the polymer material in and around the assembled stack and a separate operation such as post-heat or irradiation can be used to cure the polymer material.

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A surge arrester, comprising:

a surge arresting means comprising at least one varistor element and having first and second opposed end surfaces and a lateral surface;

first and second electrically conductive terminals electrically contacting the surge arresting means at the first and second opposed end surfaces, respectively; each terminal having a plurality of recesses on a surface facing the surge arresting means;

a plurality of elongate strength members disposed around the lateral surface of the surge arresting means but spaced apart therefrom; each strength member having first and second ends fitting into a respective recess and being tightly held therewithin by crimping of the terminal containing the recess and consequent deformation of the recess; the elongate strength members being held under tension and applying a compressive force to the surge arresting means; and a housing made of a polymeric material, wherein the polymeric material covers the surge arresting means and the strength members, partially covers the first and second terminals, and fills the space between the strength members and the surge arresting means.

2. A surge arrester according to claim 1, wherein the surge arresting means comprises plural varistor elements electrically connected in series and forming a stack of such varistor elements.

3. A surge arrester according to claim 2, further comprising a metal spacer disposed between two adjacent varistor elements.

4. A surge arrester according to claim 3, wherein the metal spacer contains at least one passageway through which passes a strength member.

5. A surge arrester according to claim 4, wherein each strength member passes through a respective passageway in the metal spacer.

6. A surge arrester according to claim 2, wherein the strength members are made of fiberglass reinforced resin.

7. A surge arrester according to claim 2, further comprising a metal spacer disposed between the stack and at least one of the first and second terminals.

8. A surge arrester according to claim 7, wherein the metal spacer contains at least one passageway through which passes a strength member.

9. A surge arrester according to claim 7, wherein the strength members are made of fiberglass reinforced resin.

10. A surge arrester according to claim 2, further including a compression member for applying a compressive force to the varistor elements.

11. A surge arrester according to claim 1, wherein the surge arresting means comprises one single varistor element.

12. A surge arrester according to claim 11, further comprising a metal spacer between the single varistor element and at least one of the first and second terminals.

13. A surge arrester according to claim 11, wherein the strength members are made of fiberglass reinforced resin, ceramic, aramid, or nylon.

14. A surge arrester according to claim 1, wherein the strength members are made of fiberglass reinforced epoxy resin or vinyl ester resin.

15. A surge arrester according to claim 1, wherein the strength members are made of ceramic, aramid, or nylon.

16. A surge arrester according to claim 1, wherein the housing is made of silicone or ethylene-vinyl acetate copolymer.

17. A surge arrester according to claim 1, wherein the housing has a plurality of sheds thereon.

18. A surge arrester according to claim 1, wherein the at least one varistor element comprises varistor material made with zinc oxide as a primary metal oxide and minor amounts of additive metal oxides selected from the group consisting of $Al_2O_3$, $B_2O_3$, BaO, $Bi_2O_3$, CaO, CoO, $Co_3O_4$, $Cr_2O_3$, FeO, $In_2O_3$, $K_2O$, MgO, $Mn_2O_3$, $Mn_3O_4$, $MnO_2$, NiO, PbO, $Pr_2O_3$, $Sb_2O_3$, $SiO_2$, SnO, $SnO_2$, SrO, $Ta_2O_5$, $TiO_2$, and combinations thereof.

19. A surge arrester according to claim 1, wherein the strength members are symmetrically disposed around the surge arresting means.

20. A surge arrester according to claim 1, wherein the strength members are between 4 and 6, inclusive, in number.

* * * * *